United States Patent
Kawasaki (10) Patent No.: US 7,755,655 B2
(45) Date of Patent: Jul. 13, 2010

(54) EXPOSURE DEVICE AND IMAGE FORMING APPARATUS

(75) Inventor: Kotaro Kawasaki, Osaka (JP)

(73) Assignee: Kyocera Mita Corporation (JP)

( * ) Notice: Subject to any disclaimer, the term of this patent is extended or adjusted under 35 U.S.C. 154(b) by 32 days.

(21) Appl. No.: 11/801,721

(22) Filed: May 10, 2007

(65) Prior Publication Data

US 2007/0263065 A1 Nov. 15, 2007

(30) Foreign Application Priority Data

May 12, 2006 (JP) .............................. 2006-133237

(51) Int. Cl.
   *B41J 2/385* (2006.01)
   *B41J 2/41* (2006.01)
   *B41J 2/435* (2006.01)
(52) U.S. Cl. ...................... 347/138; 347/152; 347/245; 347/263
(58) Field of Classification Search ........................ None
   See application file for complete search history.

(56) References Cited

U.S. PATENT DOCUMENTS 6,922,537 B2 * 7/2005 Iikawa et al. ................... 399/92
2003/0226958 A1 * 12/2003 Ohno et al. .................. 250/234
2004/0175202 A1 * 9/2004 Fujita ............................ 399/92
2005/0270612 A1 * 12/2005 Akiyama ..................... 359/206
2006/0082639 A1 * 4/2006 Kojima ........................ 347/224
2006/0092608 A1 * 5/2006 Liang et al. ................. 361/695
2007/0058235 A1 * 3/2007 Nagase ....................... 359/216

FOREIGN PATENT DOCUMENTS

| JP | 2000-194250 | | 7/2000 |
| JP | 2000338439 A | * | 12/2000 |
| JP | 2005-31160 | | 2/2005 |

* cited by examiner

*Primary Examiner*—Matthew Luu
*Assistant Examiner*—Kendrick X Liu
(74) *Attorney, Agent, or Firm*—Gerald E. Hespos; Michael J. Porco (57) ABSTRACT

An exposure device for exposing the charged surface of a photoconductive drum is provided with a light source for emitting light based on image information; a rotary multifaceted mirror for reflecting the light emitted from the light source to scan the surface of the photoconductive drum; a driving mechanism for drivingly rotating the rotary multifaceted mirror; an inner casing for covering at least the driving mechanism and the rotary multifaceted mirror; and an outer casing for covering the inner casing from the outside. An air vent for communicating the inside and outside of the inner casing is formed in a part of the inner casing facing the rotary multifaceted mirror.

8 Claims, 10 Drawing Sheets

EXPOSURE DEVICE AND IMAGE FORMING APPARATUS

BACKGROUND OF THE INVENTION

1. Field of the Invention

The present invention relates to an exposure device for exposing a photoconductive member in an image forming apparatus such as a copier or a printer, and an image forming apparatus provided with such an exposure device.

2. Description of the Related Art

A light scanning unit (LSU: laser scanner unit) is known as an exposure device of an electrophotographic image forming apparatus such as a copier and a printer. In this LSU, a light emitted from a laser based on image information is caused to be incident on a polygon mirror (rotary multifaceted mirror) rotated at high speed by a polygon motor via a lens, and the resulting reflected light is caused to irradiate the surface of a uniformly charged photoconductive drum via another lens, thereby scanning and exposing the surface of the photoconductive drum. In this way, an electrostatic latent image corresponding to the image information is formed on the surface of the photoconductive drum.

Since the polygon motor and the polygon mirror rotate at high speeds in the LSU as described above, noise and heat are generated. The noise leads to the deterioration of a workplace environment, whereas the heat generation causes the nonuniform rotation of the polygon mirror and distortions in optical devices such as lenses, thereby causing an exposure failure.

Accordingly, an exposure device covering a polygon motor and a polygon mirror using a double cover; the one cooling a polygon motor and a polygon mirror by an air flow created by a fan (e.g. Japanese Unexamined Patent Publication No. 2000-194250), and the one cooling a polygon motor and a polygon mirror by a liquid (e.g. Japanese Unexamined Patent Publication No. 2005-31160) have been proposed.

However, the above exposure device covering the polygon motor and the polygon mirror using the double cover can reduce the noise, but is rather disadvantageous in light of temperature rise since the heat remains in an inner casing. The exposure devices cooling the polygon motor and the polygon mirror by an air flow or liquid have a problem of complicated constructions.

SUMMARY OF THE INVENTION

An object of the present invention is to provide an exposure device and a light scanning unit having simple constructions and capable of preventing both noise and temperature rise, and an image forming apparatus provided with such an exposure device or a light scanning unit.

In order to accomplish this object, one aspect of the present invention is directed to an exposure device, comprising a light source for emitting light based on image information; a rotary multifaceted mirror for reflecting the light emitted from the light source to scan the surface of the photoconductive drum; a driving mechanism for drivingly rotating the rotary multifaceted mirror; an inner casing for covering at least the driving mechanism and the rotary multifaceted mirror; and an outer casing for covering the inner casing from the outside, an air vent for communicating the inside and outside of the inner casing being formed in a part of the inner casing facing the rotary multifaceted mirror.

Another aspect of the present invention is directed to an image forming apparatus, comprising a photoconductive drum; a charging device for uniformly charging the surface of the photoconductive drum; an exposure device for forming an electrostatic latent image by exposing the charged surface of the photoconductive drum based on image information; a developing device for developing the electrostatic latent image into a toner image; and a transfer device for transferring the toner image to a transfer member, wherein the exposure device has the above construction.

Still another aspect of the present invention is directed to a light scanning unit, comprising a light source for emitting light; a polygon mirror for reflecting the light emitted from the light source to irradiate a specified surface to be scanned; a polygon motor for drivingly rotating the polygon mirror; a first casing for covering at least the polygon motor and the polygon mirror; and a second casing for covering the first casing from the outside, an air vent for communicating the inside and outside of the first casing being formed in a part of the first casing facing the polygon mirror.

These and other objects, features, aspects and advantages of the present invention will become more apparent upon a reading of the following detailed description and accompanying drawings.

DETAILED DESCRIPTION OF THE PREFERRED EMBODIMENTS

Hereinafter, best modes of the present invention are described in detail with reference to the accompanying drawings. It should be noted that members and the like identified by the same reference numerals have the same constructions in the respective drawings and the repetitive description of these is suitably left out, and that the diagrammatic representation of members and the like unnecessary for the description is suitably left out.

First, the construction and operation of an image forming apparatus 10 provided with an exposure device 13 according to the present invention are schematically described and, then, the exposure device 13 is described in detail. The image forming apparatus 10 may be a copier, a printer, a facsimile machine or a complex machine of these.

Figure 1:
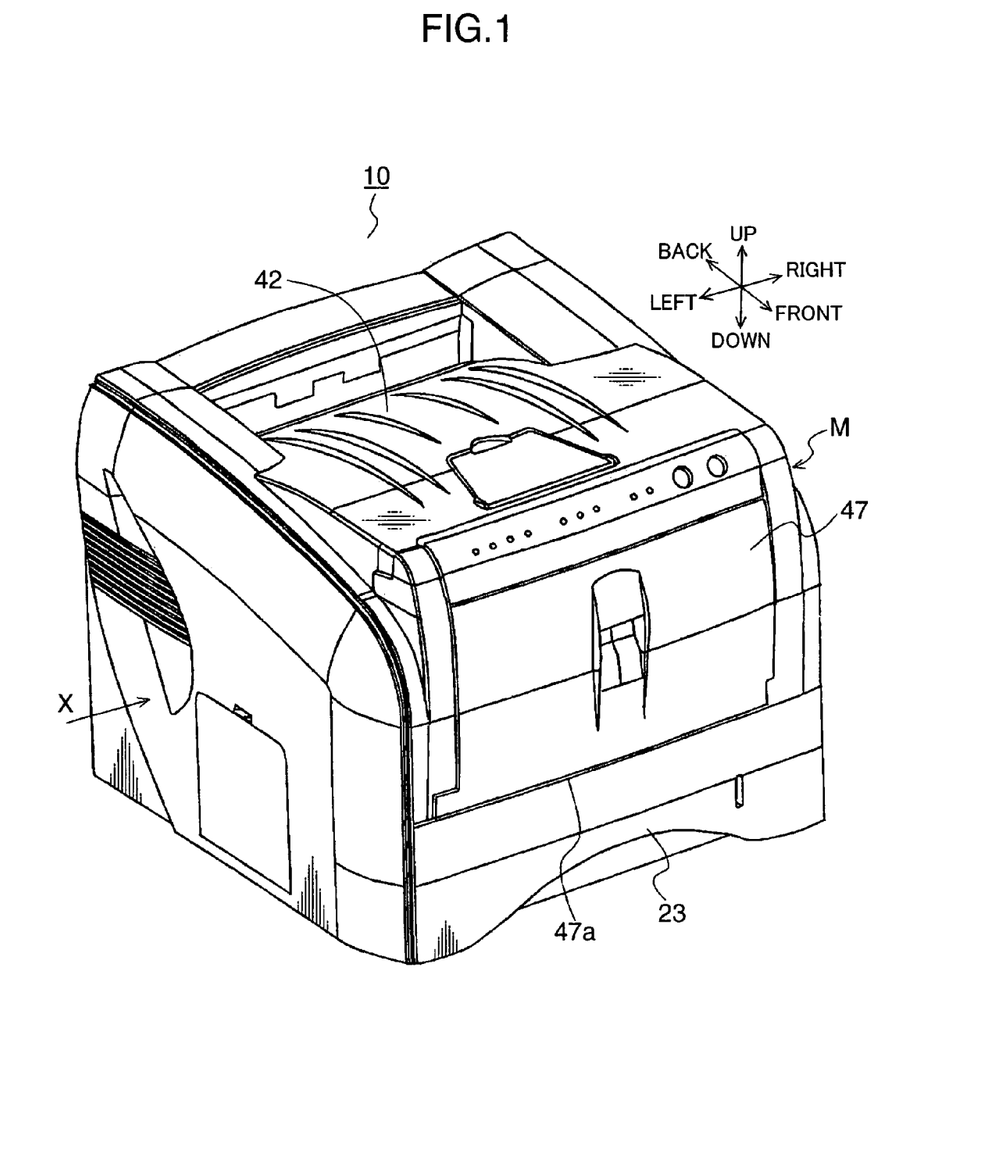
FIG. 1 is a perspective view showing the external appearance of an image forming apparatus according to one embodiment of the invention.
Figure 2:
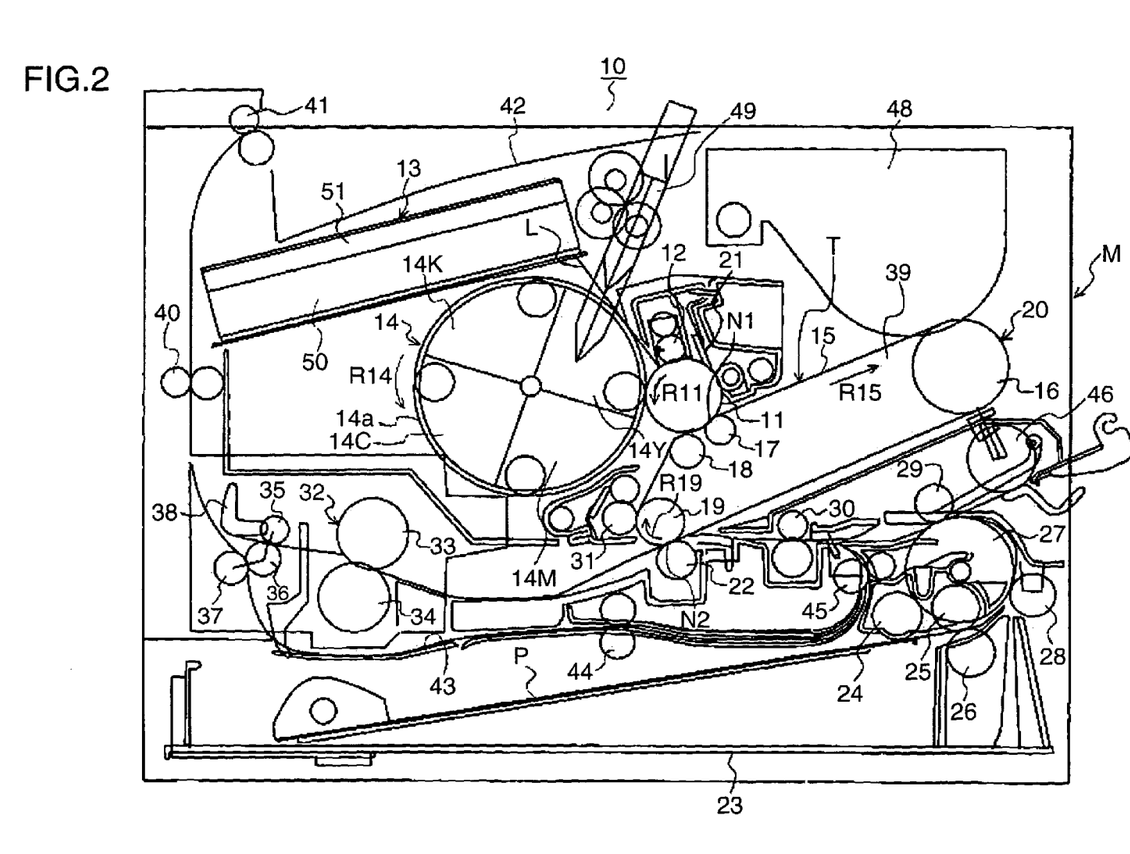
FIG. 2 is a diagrammatic vertical section of the image forming apparatus when viewed in a direction of arrow X of FIG. 1 (from a left side).

FIGS. 1 and 2 show the image forming apparatus 10 according to this embodiment. FIG. 1 is a perspective view showing the external appearance of the entire image forming apparatus 10 when viewed obliquely from an upper front left side. In the following description, directions shown by arrows at an upper right side of FIG. 1 are respectively forward, backward, leftward, rightward, upward and downward of the image forming apparatus 10 unless particularly specified. FIG. 2 is a diagrammatic vertical section of the image forming apparatus 10 when viewed in a direction of arrow X of FIG. 1 (from a left side).

FIG. 2 shows a state where an intermediate transfer unit 20 is mounted at a specified position (transfer unit T) of an image forming apparatus main body M. The image forming apparatus 10 shown in FIGS. 1 and 2 is a four-color full color image forming apparatus (printer) of the electrophotographic type and intermediate transfer type, and the intermediate transfer unit 20 is detachably mountable into the image forming apparatus main body M. Here, the image forming apparatus main body M means a part of the image forming apparatus 10 obtaining by removing detachable units such as the intermediate transfer unit 20 from the entire image forming apparatus 10. This is substantially equivalent to an assembly of a frame and members fixed to the frame.

As shown in FIG. 2, a drum-shaped electrophotographic photoconductive member (hereinafter, "photoconductive drum") 11 as an image bearing member is arranged substantially in the middle of the image forming apparatus main body M of the image forming apparatus 10. The photoconductive drum 11 is drivingly rotated in a direction of arrow R11 by a driving mechanism (not shown), and the surface (outer circumferential surface) is uniformly charged with specified polarity and potential by a charging roller 12. The surface of the charged photoconductive drum 11 is irradiated with a laser beam L based on image information by an exposure device 13 such as a laser scanner, whereby electric charges at exposed parts are removed to form an electrostatic latent image. The exposure device 13 is accommodated inside a casing main body 50 and an outer cover 51 as an upper lid for the casing main body 50 in order to suppress noise. These exposure device 13, casing main body 50, outer cover 51 are described in detail later.

The electrostatic latent image is developed by a developing unit 14. The developing unit 14 includes a rotatable rotary member 14a and four developing devices 14Y, 14M, 14C and 14K mounted in this rotary member 14a, i.e. those for yellow (Y) as a first color, magenta (M) as a second color, cyan (C) as a third color and black (K) as a fourth color. The developing unit 14 is such that the developing device used to develop the electrostatic latent image formed on the surface of the photoconductive drum 11, i.e. the developing device 14Y for yellow as the first color in the example of FIG. 2, comes to be located at a development position to face the surface of the photoconductive drum 11 by the rotation of the rotary member 14a in a direction of arrow R14. The yellow developing device 14Y located at the development position develops the electrostatic latent image on the surface of the photoconductive drum 11 into a yellow toner image by causing yellow toner to adhere to the electrostatic latent image.

This yellow toner image is transferred to an intermediate transfer belt 15 as a belt member. The intermediate transfer belt 15 is an endless belt and mounted on four rollers, i.e. a tension roller 16, a primary transfer roller (transfer unit) 17, a guide roller 18 and a drive roller 19. In this embodiment, the drive roller 19 is a roller opposed to a secondary transfer roller 22 to be described later in order to sandwich the intermediate transfer belt 15 in cooperation with the secondary transfer roller 22.

The intermediate transfer belt 15 is pressed against the photoconductive drum 11 by the primary transfer roller 17 from the under side, i.e. inner side, whereby a primary transfer nip portion N1 in the form of a strip long in a transverse direction is formed between the photoconductive drum 11 and the intermediate transfer belt 15. The intermediate transfer belt 15 turns in a direction of arrow R15 (endlessly moves) as the drive roller 19 is drivingly rotated in a direction of arrow R19 by a driving mechanism (not shown). The yellow toner image formed on the surface of the above photoconductive drum 11 is primarily transferred to the surface of the intermediate transfer belt 15 to be borne on this surface at the primary transfer nip portion N1 by the application of a primary transfer bias to the primary transfer roller 17.

It should be noted that the above intermediate transfer belt 15, tension roller 16, primary transfer roller 17, guide roller 18, drive roller 19, etc. are incorporated into an intermediate transfer housing 39 to construct the intermediate transfer unit 20 as a whole. This intermediate transfer unit 20 is mountable into and detachable from the image forming apparatus main body M as a whole.

The photoconductive drum 11 after the primary transfer of the toner image has primary transfer residual toner, i.e. toner remaining on the surface of the photoconductive drum 11 without being transferred to the intermediate transfer belt 15 during the primary transfer, removed by a cleaning device 21 and, thereafter, is used for the formation of a second color magenta image.

The aforementioned image forming processes, i.e. a series of processes including charging, exposure, development, primary transfer and cleaning are successively performed for the remaining three colors, i.e. magenta, cyan and black. Thus, four color toner images of yellow, magenta, cyan and black are borne on the surface of the intermediate transfer belt 15 while being superimposed each other.

When the primary transfer of the four toner images to the surface of the intermediate transfer belt 15 is completed, these toner images are transferred to a sheet P conveyed from a sheet cassette 23 arranged at the bottom of the image forming apparatus main body M. The sheet cassette 23 is mountable into and detachable from the image forming apparatus main body M in forward and backward directions. Sheets P are contained in the sheet cassette 23 and fed one by one by a dispense roller 24, a feed roller 25 and a retard roller 26. The sheet P is conveyed to a pair of registration rollers 30 in a standby state by a large-diameter roller 27, conveyance rollers 28, 29 and the like to correct an oblique conveyance.

Thereafter, the sheet P is fed to a secondary transfer nip portion N2 by the rotation of the registration rollers 30 in synchronism with the four toner images on the surface of the intermediate transfer belt 15. The four toner images are secondarily transferred to the sheet P fed to the secondary transfer nip portion N2 in this way at once by the application of a secondary transfer bias to the secondary transfer roller 22. It should be noted that the secondary transfer roller 22 is separated from the surface of the intermediate transfer belt 15 except during the secondary transfer of the toner image.

The intermediate transfer belt 15 after the secondary transfer of the toner image has toner particles remaining on the surface thereof (secondary transfer residual toner) without being transferred to the sheet P. The toner particles are removed by a belt cleaner 31, and the intermediate transfer belt 15 is used for the primary and secondary transfers of a next toner image.

On the other hand, the sheet P after the secondary transfer of the toner image is conveyed to a fixing device 32, where the toner image is fixed to the surface of the sheet P by being heated and pressurized by a fixing roller 33 and a pressure roller 34. The sheet P having the toner image fixed thereto is discharged to a discharge tray 42 on the upper surface of the image forming apparatus main body M by conveyance rollers 35, 36, a switching flapper 38, a pair of conveyance rollers 40 and a pair of discharge rollers 41. In this way, the formation of the four-color full color image on a single side (front side) of one sheet P is completed.

Contrary to this, in the casing of forming images on both surfaces (front and rear sides) of a sheet P, the switching flapper 38 is switched, the pair of conveyance rollers 40 are rotated in reverse directions, and the conveyance rollers 36, 37 are rotated when the trailing end of the sheet P having the toner image formed on the front side passes the conveyance rollers 35, 36, and the sheet P is introduced to a refeed path 43 to be turned upside down. The sheet P is further conveyed to the aforementioned pair of registration rollers 30 by a pair of refeed rollers 44 and a pair of reconveyance rollers 45, has a toner image secondarily transferred to the rear side thereof as in the case of the single side (front side) and is discharged to the discharge tray 42 after the toner image is fixed. In this way, the formation of the four-color full color image on both sides of the one sheet P is completed.

A manual feed roller 46 used upon the manual sheet feeding is disposed above the large-diameter roller 27 at the right side of the image forming apparatus main body M. At the time of the manual sheet feeding, a user opens an opening cover 47 shown in FIG. 1 by pulling the upper end thereof forward about a supporting point 47a. In this way, the rear side of a sheet P can be guided using the upper surface of the opening cover 47 as a manual feed tray. It should be noted that this opening cover 47 is also opened and closed, for example, upon mounting and detaching the intermediate transfer unit 20 into and from the image forming apparatus main body M, upon the exchange of a toner replenishing container 48 (see FIG. 2) to be described later, and upon a jam (sheet jam) processing.

The toner replenishing container 48 is disposed above the intermediate transfer unit 20. The toner replenishing container 48 individually contains toner particles of the respective colors to be replenished to the developing devices 14Y, 14M, 14C and 14K of the respective colors of the developing unit 14. These toner particles of the respective colors are replenished to the developing devices 14Y, 14M, 14C and 14K of the respective colors by toner replenishing devices 49 according to needs. It should be noted that, in the above image forming apparatus 10, the photoconductive drum 11, the charging roller 12, the exposure device 13, the developing unit 14, the intermediate transfer unit 20, the cleaning device 21 and the like constitute an image forming assembly. The summary of the construction and operation of the entire image forming apparatus 10 ends with the above description.

Figure 3:
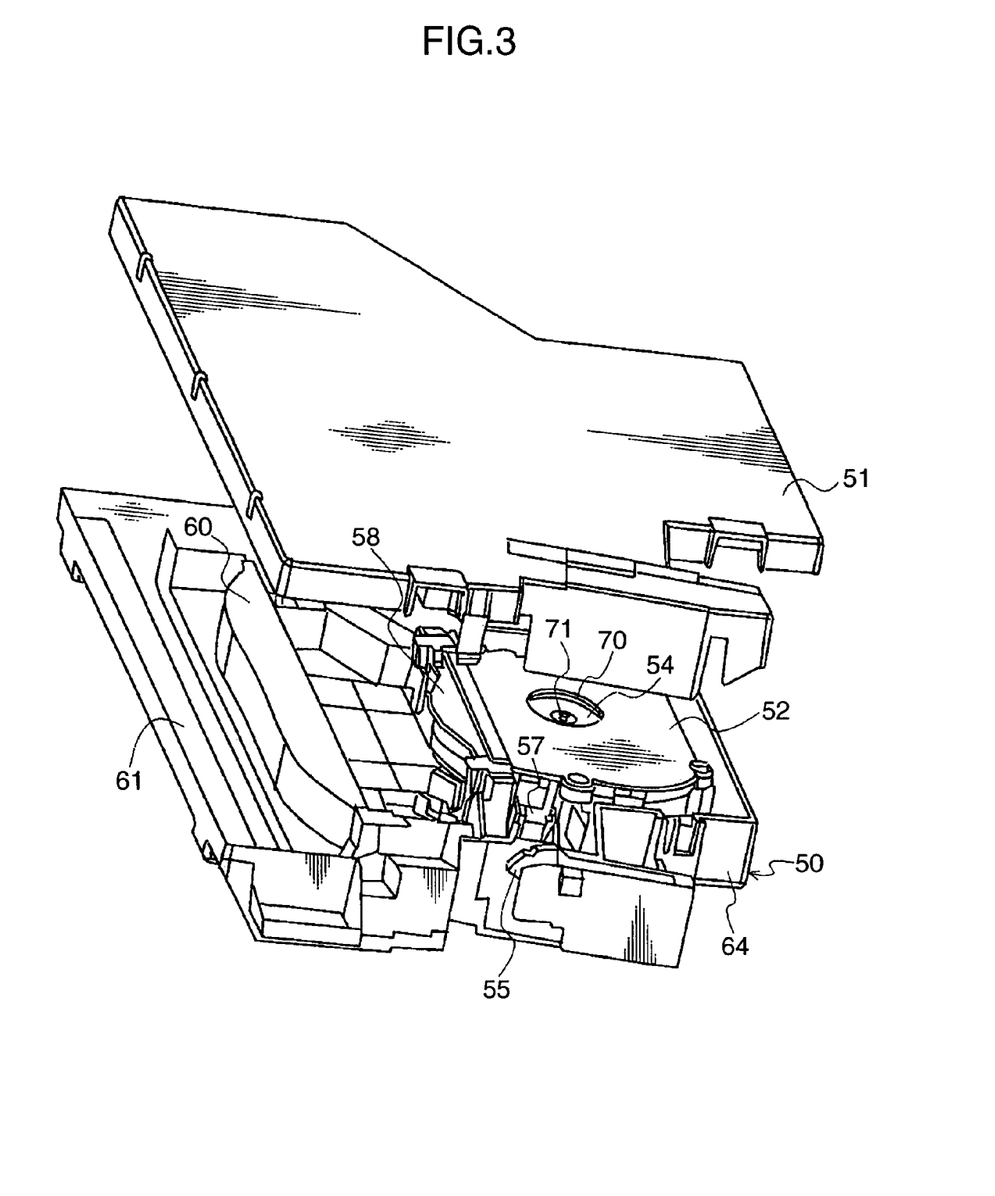
FIG. 3 is a perspective view of an entire exposure device showing a state where an outer cover as an upper lid is detached from a casing main body.
Figure 4:
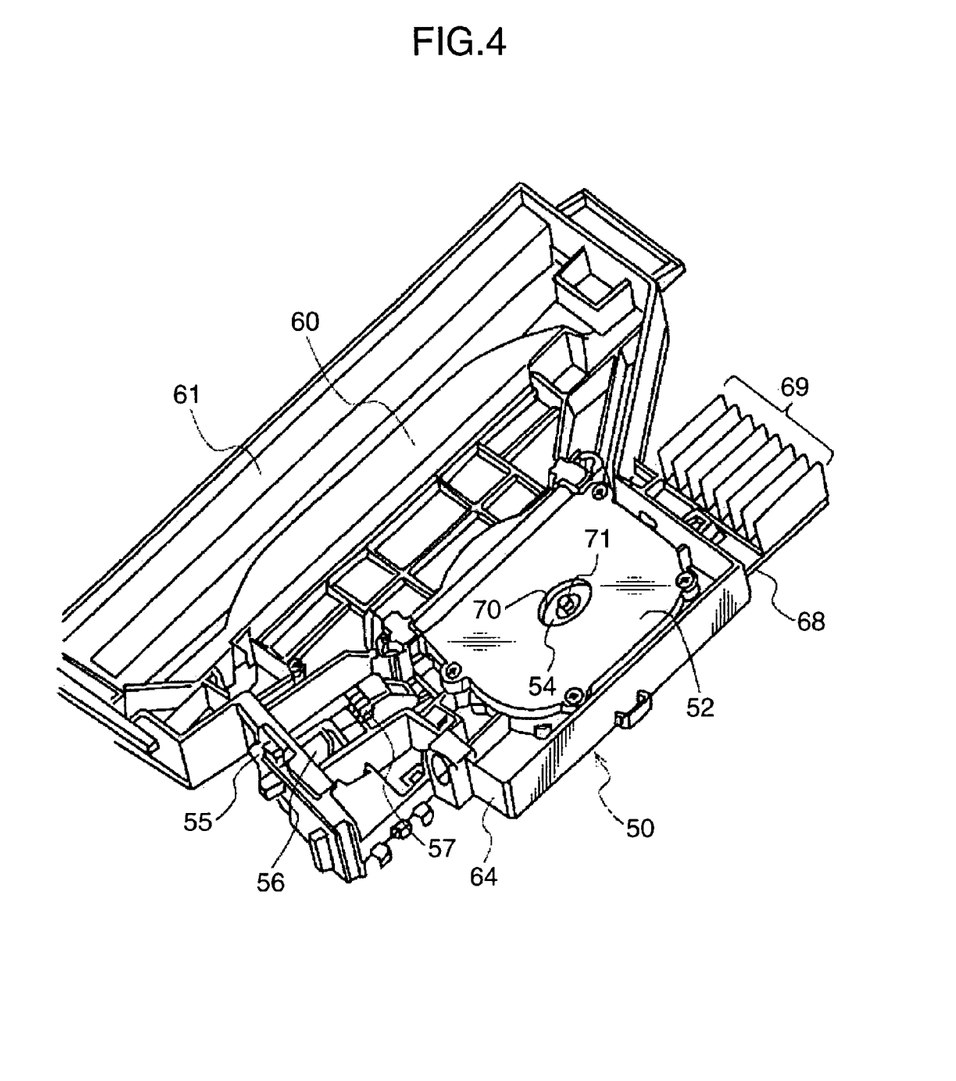
FIG. 4 is a perspective view showing a state of the exposure device without the outer cover.
Figure 5:
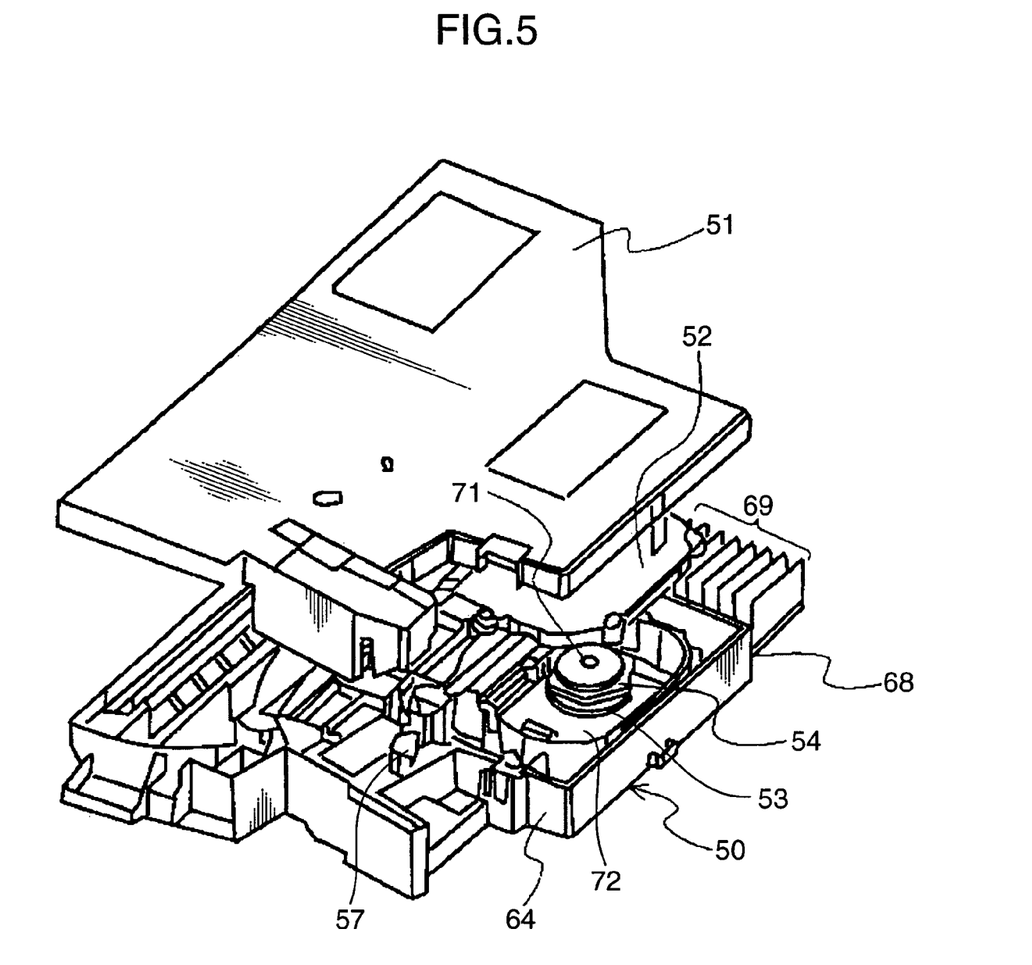
FIG. 5 is a perspective view of the exposure device showing a state where both the outer cover and an inner cover are detached.
Figure 6:
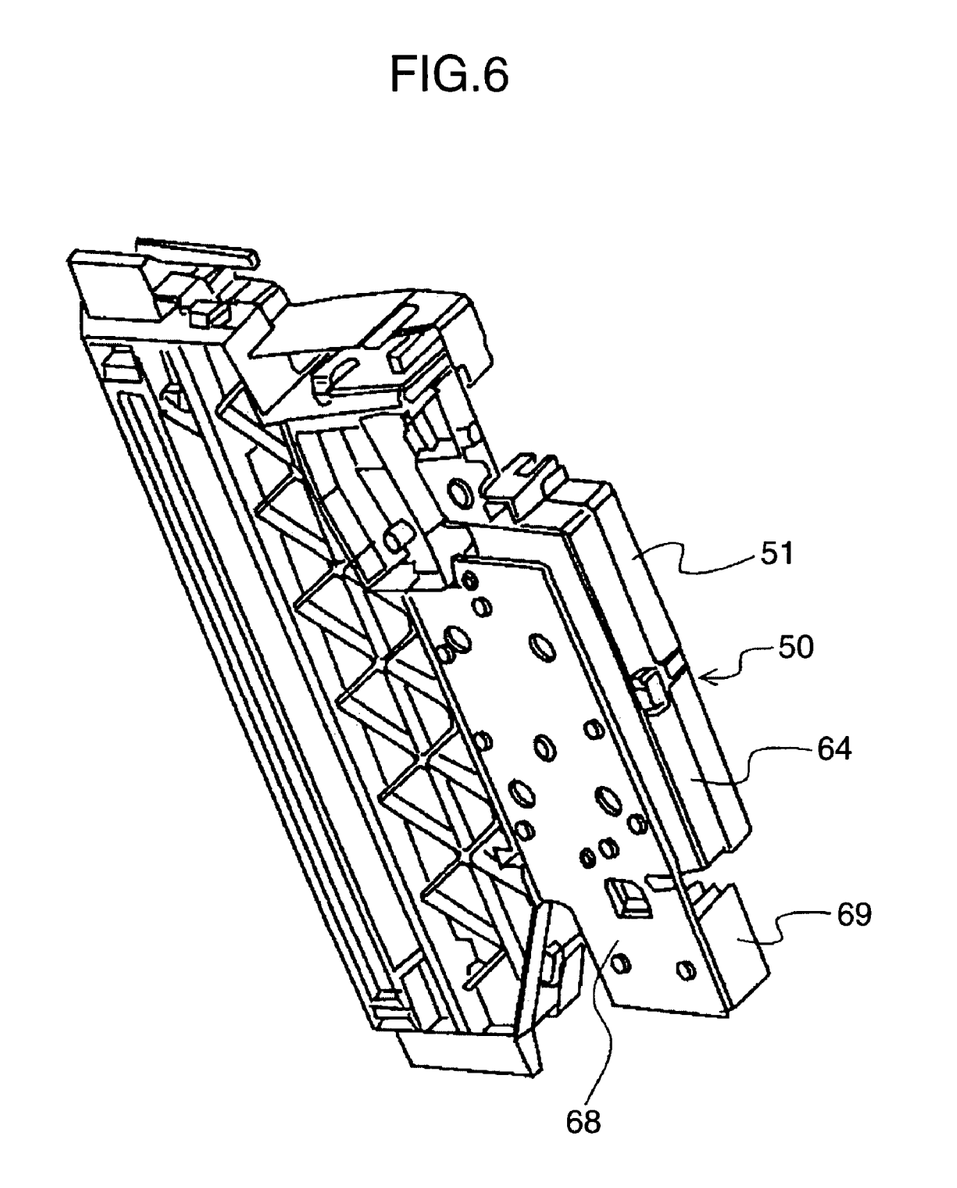
FIG. 6 is a perspective view of the entire exposure device when viewed obliquely from below.
Figure 7:
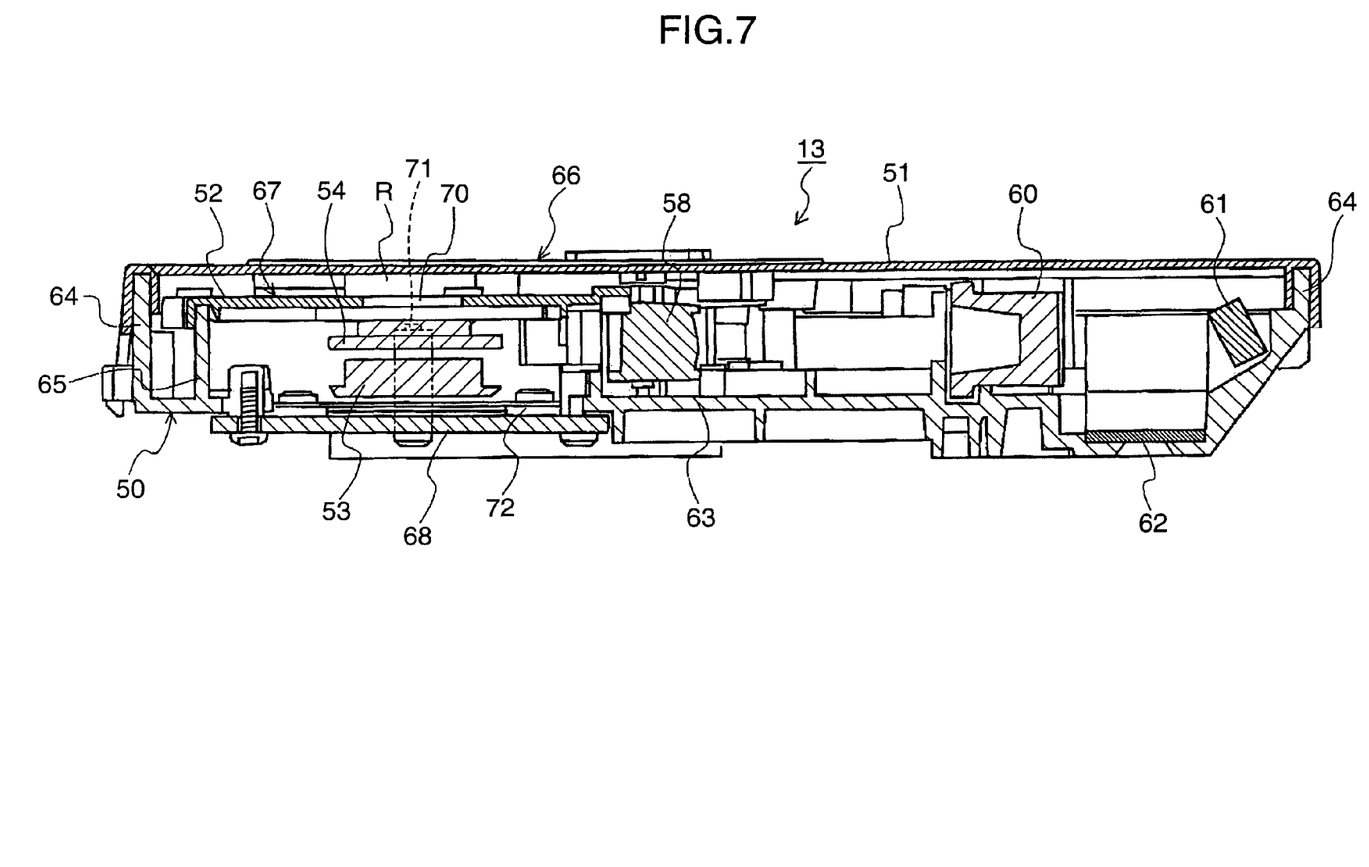
FIG. 7 is a vertical section along forward and backward directions of the exposure device.

Next, the exposure device 13 (light scanning unit) is described in detail with reference to FIGS. 3 to 7. In this embodiment, the exposure device 13 is constructed as an exposure unit comprised of a casing and optical devices accommodated in this casing. FIG. 3 is a perspective view of the entire exposure device 13 showing a state where an outer cover 51 as an upper lid is detached from a casing main body 50. FIG. 4 is a perspective view showing a state of the developing unit 13 without the outer cover 51. FIG. 5 is a perspective view showing a state where the outer cover 51 and an inner cover 52 are detached. FIG. 6 is a perspective view of the entire exposure device 13 when viewed obliquely from below. FIG. 7 is a vertical section of the exposure device 13 along forward and backward directions (sub-scanning direction).

As shown in FIGS. 3 to 7, the exposure device 13 includes a polygon motor (driving mechanism) 53 rotating at high speed, a polygon mirror (rotary multifaceted mirror) disposed above the polygon motor 53 and rotated at high speed by the rotation of the polygon motor 53, and a semiconductor laser (light source) 55.

Light emitted from the semiconductor laser 55 based on image information irradiates the polygon mirror 54 rotating at high speed via a collimator lens 56 and a cylindrical lens 57. The light reflected by the polygon mirror 54 passes through a toric lens 58 and a focusing lens 60 and is reflected by a reflecting mirror 61. Thereafter, the reflected light passes through a dustproof glass 62, scans and exposes the surface of the uniformly charged photoconductive drum 11. The optical devices constituting the exposure device 13 are all accommodated in the casing main body 50.

The casing main body 50 is provided with a bottom portion 63, an outer surrounding wall 64 standing at the outer periphery of the bottom portion 63, an inner surrounding wall 65 standing at parts of the bottom portion 63 inside the outer surrounding wall 64, the outer cover 51 to be mounted on the entire outer surrounding wall 64 from above, and the inner cover 52 to be mounted on the entire inner surrounding wall 65 from above. As shown in FIGS. 4-7, the outer surrounding wall 64 includes an upwardly projecting wall extending up from the bottom portion 63 of the casing main body 50 and a downwardly projecting wall projecting down from the outer cover 51 of the casing main body 50. The upwardly projecting wall and the downwardly projecting wall of the casing main body 50 are telescoped together and are substantially free of air vent openings therethrough, as shown in FIGS. 3-7.

The outer casing 66 is comprised of the bottom portion 63, the outer surrounding wall 64 and the outer cover 51, whereas the inner casing 67 is comprised of a part of the bottom portion 63 inside the inner surrounding wall 65, the inner surrounding wall 65 and the inner cover 52. Thus, the outer casing 66 covers the inner casing 67 from the outside. A plate-shaped space R is defined between the inner cover 52 of the inner casing 67 and the outer cover 51 of the outer casing 66. It should be noted that a part of the inner surrounding wall 65 is constituted by the aforementioned toric lens 58.

Out of the above optical devices, the polygon motor 53 and the polygon mirror 54 are arranged in the inner casing 67, and the other optical devices are arranged outside the inner casing 67 and inside the outer casing 66.

As shown in FIGS. 4 to 7, a rectangular heat radiating plate 68 is disposed at a part of the bottom portion 63 of the casing main body 50 corresponding to the inner casing 67. A part of this heat radiating plate 68 further extends outward from the outer casing 66, and a plurality (multitude) of heat radiating fins 69 stand on this extended part. The heat radiating plate 68 supports the polygon motor 53 and a board 72 from below and is designed to release heats generated by them to the outside through itself and the heat radiating fins 69.

In this embodiment, the inner cover 52 constituting a part (upper part) of the inner casing 67 is formed with an air vent 70 at a position facing the aforementioned polygon mirror 54, i.e. at a part located above the polygon mirror 54. This air vent 70 is for communicating the inside of the inner casing 67 and the space R. In this embodiment, the air vent 70 is arranged right above a rotary shaft 71 as a center of rotation of the polygon mirror 54 and formed to be smaller than an inscribed circle of the polygon mirror 54 having a polygonal plan view.

According to this embodiment, the polygon motor 53 and the polygon mirror 54 are accommodated in the inner casing 67, and the inner casing 67 is entirely accommodated in the outer casing 66. In other words, the polygon motor 53 and the polygon mirror 54 are doubly covered by the inner and outer casings 67 and 66. Thus, noises generated by the polygon motor 53 and the polygon mirror 54 are unlikely to leak to the outside of the outer casing 66.

Further, air in the inner casing 67 heated up by the high-speed rotation of the polygon motor 53 and the polygon mirror 54 swirls in the same direction as the rotational direction of the polygon mirror 54 in the vicinity of the polygon mirror 54. Accordingly, the heated-up air smoothly passes through the air vent 70 while swirling since the air vent 70 is arranged right above the rotary shaft 71 of the polygon mirror 54. Further, the air discharged from the inner casing 67 through the air vent 70 tends to remain between the inner and outer covers 52, 51 because the space R between the inner and outer covers 52, 51 is narrow. However, the air being discharged is swirled and smoothly flows without remaining as described above, wherefore heat discharge efficiency can be improved.

Since the air vent 70 is formed to be smaller than the inscribed circle of the polygon mirror 54, the noise generated by the polygon motor 53 does not directly come out through the air vent 70 by being blocked by the polygon mirror 54. Accordingly, the noise can be reduced by that much.

Although the case of one air vent 70 is described in the above embodiment, the present invention is not limited thereto. For example, a plurality of air vents 70 may be formed in an area of the inner cover 52 (inner casing 67) corresponding to the inscribed circle of the polygon mirror 54. The size and arrangement of the air vents 70 in this case are suitably set based on experiments or the like in such a manner as to reduce noise and improve a temperature rise preventing effect. The size of the air vents 70 is preferably smaller in light of noise prevention while being preferably larger in light of temperature rise prevention. Therefore, the size and arrangement of the air vents 70 also differ depending on which effect is prioritized.

Figure 8:
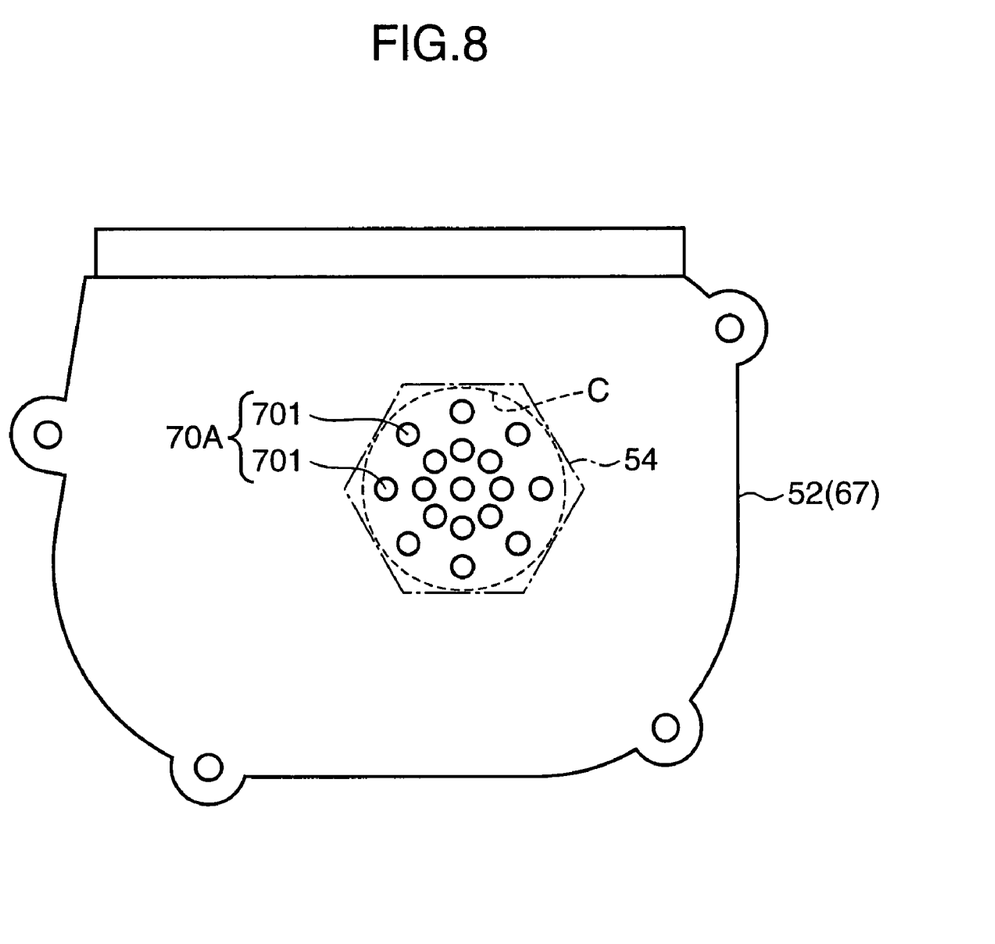
FIG. 8 is a plan view showing a modification of air vents.

FIG. 8 is a plan view showing air vents 70A according to a modification. In FIG. 8, the air vents 70A are a plurality of radially arranged small holes 701. A plurality of small holes 701 are formed in an area of the inner cover 52 corresponding to the inscribing circuit C of the polygon mirror 54.

Figure 9:
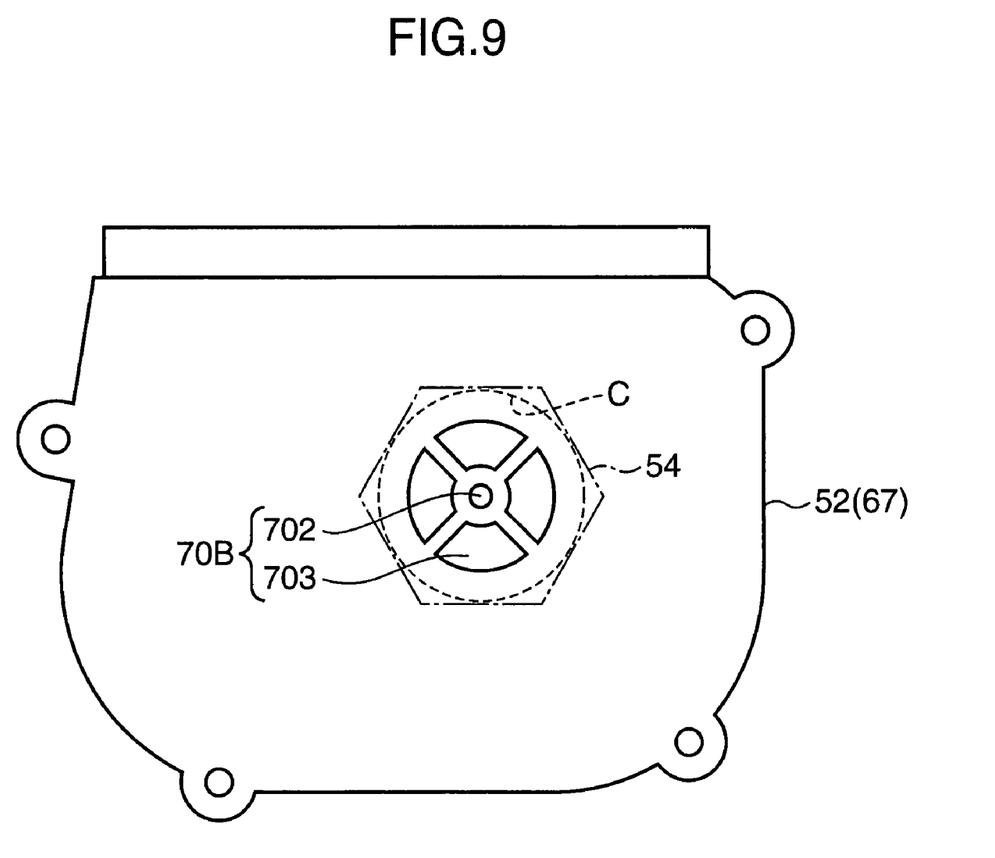
FIG. 9 is a plan view showing another modification of air vents.

FIG. 9 is a plan view showing air vents 70B according to another modification. In FIG. 9, the air vents 70B include one round air vent 702 located at a central position right above the rotary shaft 71, and four fan-shaped air vents 703 arranged around the round air vent 702. The round air vent 702 and the fan-shaped air vents 703 are formed in an area of the inner cover 52 corresponding to the inscribed circle C of the polygon mirror 54.

Figure 10:
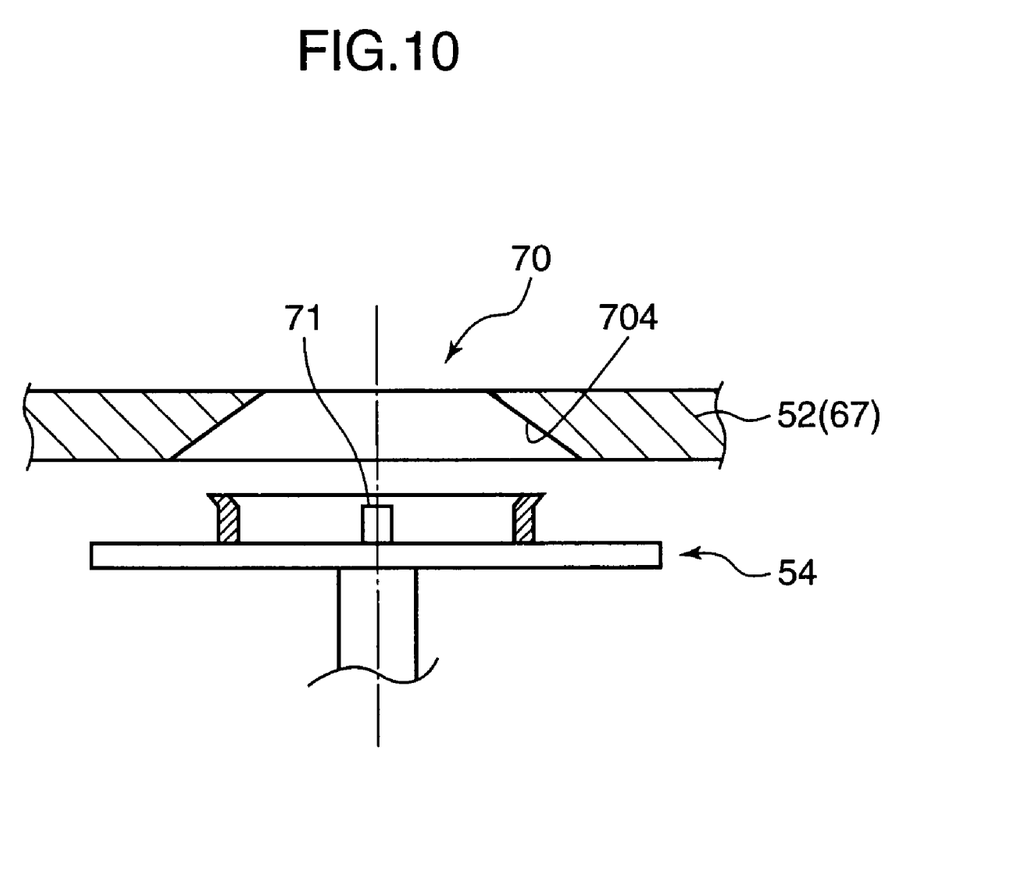
FIG. 10 is a section showing still another modification of an air vent.

The air vent 70 may be formed to have a tapered portion 704 tapered along the thickness direction of the inner cover 52 (inner casing 67) as shown in FIG. 10. This tapered portion 704 makes the diameter of the air vent 70 smaller from the lower side toward the upper side. In this case as well, air discharged through the air vent 70 can be caused to smoothly flow.

INDUSTRIAL APPLICABILITY

In the above description, the noise and temperature rise resulting from the high-speed rotation of the polygon motor and the polygon mirror are suppressed by the present invention. However, the present invention is not limited thereto and is widely applicable also to cases where both noise and temperature rise are generally suppressed. Further, the present invention is also applicable to other light scanning units using a polygon motor and a polygon mirror other than exposure devices.

The specific embodiments described above mainly contain inventions having the following constructions.

One aspect of the present invention is directed to an exposure device for exposing the charged surface of a photoconductive drum, comprising a light source for emitting light based on image information; a rotary multifaceted mirror for reflecting the light emitted from the light source to scan the surface of the photoconductive drum; a driving mechanism for drivingly rotating the rotary multifaceted mirror; an inner casing for covering at least the driving mechanism and the rotary multifaceted mirror; and an outer casing for covering the inner casing from the outside, an air vent for communicating the inside and outside of the inner casing being formed in a part of the inner casing facing the rotary multifaceted mirror.

According to such an exposure device, the driving mechanism and the rotary multifaceted mirror can be covered by the inner casing and the outer casing, whereby noise generated by the driving mechanism and the rotary multifaceted mirror and leaking to the outside can be reduced. Further, the air vent is formed in the part of the inner casing facing the rotary multifaceted mirror to communicate the inner and outer casings. Thus, despite a simple construction, the exposure device can suppress a temperature rise by dispersing heats generated by the driving mechanism and the rotary multifaceted mirror between the inner casing and the outer casing via the air vent. Further, since the air vent is positioned to face the rotary multifaceted mirror, heated-up air in the inner casing can be efficiently dispersed.

In the above construction, the air vent is preferably formed at a position corresponding to the center of rotation of the rotary multifaceted mirror. With such an air vent, the heated-up air in the inner casing can be more efficiently dispersed.

In this case, the air vent is preferably formed to be smaller than an inscribed circle of the rotary multifaceted mirror. With such an air vent, noise generated by the driving mechanism at a side of the rotary multifaceted mirror opposite to the air vent does not directly come out through the air vent by being blocked by the rotary multifaceted mirror. Therefore, the noise can be reduced by that much.

In the above construction, it is preferable that the driving mechanism is a motor; that a rotary shaft of the motor is coupled to the center of rotation of the rotary multifaceted mirror; and that the motor is arranged at a side of the rotary multifaceted mirror opposite to the air vent.

In the above construction, a plurality of air vents may be formed in an area smaller than the inscribed circle of the rotary multifaceted mirror.

Further, the air vent may be tapered along the thickness direction of the inner casing. With this construction, heat discharge efficiency in the inner casing can be improved by causing air being discharged through the air vent to smoothly flow.

Another aspect of the present invention is directed to a light scanning unit, comprising a light source for emitting light; a polygon mirror for reflecting the light emitted from the light source to irradiate a specified surface to be scanned; a polygon motor for drivingly rotating the polygon mirror; a first casing for covering at least the polygon motor and the polygon mirror; and a second casing for covering the first casing from the outside, an air vent for communicating the inside and outside of the first casing being formed in a part of the first casing facing the polygon mirror.

Still another aspect of the present invention is directed to an image forming apparatus, comprising a photoconductive drum, a charging device for uniformly charging the surface of the photoconductive drum; an exposure device for forming an electrostatic latent image by exposing the charged surface of the photoconductive drum based on image information; a developing device for developing the electrostatic latent image into a toner image; and a transfer device for transferring the toner image to a transfer member, the exposure device having the above construction.

According to this construction, noise generated by the exposure device can be reduced in the image forming apparatus since the exposure device has the construction of the inventive exposure device. Further, a temperature rise in the image forming apparatus resulting from a temperature rise of the exposure device can be suppressed.

This application is based on Patent Application No. 2006-133237 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. An exposure device for exposing the charged surface of a photoconductive drum, comprising:
    a light source configured to emit light based on image information;
    a rotary multifaceted mirror configured to reflect the light emitted from the light source to scan the surface of the photoconductive drum;
    a driving mechanism configured to drivingly rotate the rotary multifaceted mirror;
    an inner casing configured to cover at least the driving mechanism and the rotary multifaceted mirror;
    an outer casing configured to cover the inner casing from the outside:
    an air vent configured to communicate the inside and outside of the inner casing being formed in a part of the inner casing facing the rotary multifaceted mirror; and
    a heat radiating plate configured to release heat generated inside the inner casing to outside, the heat radiating plate having a part extending outward from the outer casing, wherein
    the outer casing includes a bottom portion, an outer surrounding wall standing on the bottom portion, and an outer cover covering an upper opening of the outer surrounding wall, and at least the outer cover being free of openings therethrough,
    the inner casing includes an inner surrounding wall standing on the bottom portion inside the outer surrounding wall, and an inner cover covering an upper opening of the inner surrounding wall, and
    the outer cover is provided above the inner cover with a space therebetween,
    the air vent is provided at a position facing the rotary multifaceted mirror in the inner cover so that rotation of the rotary multifaceted mirror by the driving mechanism generates an air flow for diffusing air into the space between the outer cover and the inner cover, wherein
    the outer surrounding wall includes an upwardly projecting wall extending up from the bottom portion of the outer casing and a downwardly projecting wall projecting down from the outer cover of the outer casing, the upwardly projecting wall and the downwardly projecting wall of the outer casing being telescoped together and being substantially free of air vent openings therethrough.

2. An exposure device according to claim 1, wherein the air vent is formed at a position corresponding to the center of rotation of the rotary multifaceted mirror.

3. An exposure device according to claim 2, wherein the air vent is formed to be smaller than an inscribed circle of the rotary multifaceted mirror.

4. An exposure device according to claim 2, wherein:
    the driving mechanism is a motor;
    a rotary shaft of the motor is coupled to the center of rotation of the rotary multifaceted mirror; and
    the motor is arranged at a side of the rotary multifaceted mirror opposite to the air vent.

5. An exposure device according to claim 2, wherein a plurality of air vents are formed in an area smaller than the inscribed circle of the rotary multifaceted mirror.

6. An exposure device according to claim 1, wherein the air vent is tapered along the thickness direction of the inner casing.

7. An exposure device according to claim 1, wherein the inner surrounding wall is spaced inwardly from the outer surrounding wall.

8. An exposure device according to claim 1, wherein the heat radiating plate is disposed at a part of the bottom portion of the outer casing and supports the rotary multifaceted mirror.

* * * * *